United States Patent [19]

Sommargren

[11] Patent Number: 4,881,815

[45] Date of Patent: Nov. 21, 1989

[54] LINEAR AND ANGULAR DISPLACEMENT MEASURING INTERFEROMETER

[75] Inventor: Gary E. Sommargren, Santa Cruz, Calif.

[73] Assignee: Zygo, Corporation, Middlefield, Conn.

[21] Appl. No.: 216,821

[22] Filed: Jul. 8, 1988

[51] Int. Cl.$^4$ ............................................... G01B 9/02
[52] U.S. Cl. .................................... 356/349; 356/358; 356/363
[58] Field of Search .................... 356/344, 358, 363

[56] References Cited

U.S. PATENT DOCUMENTS

| | | | |
|---|---|---|---|
| 4,746,216 | 5/1988 | Sommargren | 356/359 |
| 4,752,133 | 6/1988 | Sommargren | 356/349 |
| 4,807,997 | 2/1989 | Sommargren | 356/349 |

Primary Examiner—Davis L. Willis
Assistant Examiner—Matthew W. Koren
Attorney, Agent, or Firm—Bryan, Cave, McPheeters & McRoberts

[57] ABSTRACT

A single interferomter system capable of measuring accurately linear displacement and angular displacement simultaneously of a movable plane mirror (90) comprises a source (10) of a frequency stabilized input beam (12), a polarization beamsplitter (80), two quarter-wave plates (88, 108), a mirror (89), and a retroreflector (81), to reflect one polarization component of the input beam (12) twice from the movable mirror (90) to produce a first output beam and to reflect the other polarization component of the input beam (12) twice from the stationary mirror (89) to produce a second output beam. The beamsplitter (80) recombines the output beams into a third output beam having two orthogonally polarized components related to the linear displacement of the movable mirror (90) at the first position. The third output beam is divided into a fourth output beam and a fifth beam parallel to, spatially displaced from, and traveling in the same direction as the input beam (12) and has its polarization components rotated by 90 degrees from the third output beam. The interference between the components of the fourth beam is detected by photodetector (94) and the phase change is extracted from the resultant signal (96, 99) with the measured phase being related to the linear displacement of the mirror (90) at the first position. A second photoelectric detector (194) produces a signal from which the phase change is extracted from the resultant signal (97, 109) with the second measured phase related to the angular displacement of the movable plane mirror (90).

40 Claims, 1 Drawing Sheet

LINEAR AND ANGULAR DISPLACEMENT MEASURING INTERFEROMETER

CROSS REFERENCE TO RELATED APPLICATIONS

This Application is related to the contemporaneously filed, commonly owned copending patent applications of Carl A. Zanoni and me, respectively, both entitled "Linear and Angular Displacement Measuring Interferometer," the contents of which are specifically incorporated by reference herein in their entirety.

BACKGROUND OF THE INVENTION

1. Field of the Invention

The present invention relates to apparatus for the simultaneous measurement of both the linear and angular displacements of a plane mirror. More particularly, the invention relates to optical apparatus which is useful for high accuracy linear and angular displacement metrology using interferometry.

2. The Prior Art

High accuracy linear and angular displacement measurements are required in the machine tool industry and in the semi-conductor industry. Linear displacement is commonly measured with an interferometer. Angular displacement is commonly measured with either an interferometer or an autocollimator.

There are numerous interferometer configurations which can be used to measure the linear displacement of a plane mirror. The plane mirror interferometer and the differential plane mirror are the two most common, see for example S. J. Bennett, "A Double-Passed Michelson Interferometer," Opt. Comm. 4, pp. 428–430, 1972, R. R. Baldwin and G. J. Siddall, "A Double-Pass Attachment for the Linear and Plane Interferometer," Proc. SPIE, Vol. 480, pp. 78–83 (May 1984), and G. E. Sommargren, U.S. Pat. No. 4,693,605, issued Sept. 15, 1987.

Sommargren, U.S. Pat. No. 4,717,250, issued Jan. 5, 1988, describes an angular displacement measuring interferometer.

It is possible to measure simultaneously the linear and angular displacements of a plane mirror by using either (1) two linear displacement interferometers offset from each other, or (2) a linear displacement interferometer and an angular displacement interferometer or an autocollimator.

However, using two devices, one to measure linear displacement and the second to measure either linear displacement or angular displacement, has the following disadvantages: (1) complexity because two devices must be installed and aligned, and (2) considerable space is needed thereby requiring that the size of the mirror being measured be increased, especially if it moves in a direction in the plane of the mirror.

The present invention retains the preferred characteristics of both the linear displacement interferometer and the angular displacement interferometer while avoiding the serious limitations of using two of these devices. In the present invention, linear and angular displacements of a plane mirror are measured in a single, compact dual interferometer. The improvements of the present invention thusly overcome the disadvantages of the prior art and allow the high accuracy, simultaneous measurement of both linear and angular displacements of a plane mirror, i.e., to a small fraction of a micrometer and of an arc second, respectively, required for precision high speed X-Y stages.

SUMMARY OF THE INVENTION

In accordance with the instant invention, I provide an interferometer system capable of measuring accurately linear displacement and angular displacement simultaneously of a plane mirror comprising: (1) a source of a frequency stabilized input beam with two linear orthogonally polarized components which may or may not be of the same frequency; (2) means, most preferably an optical system comprised of a polarization beamsplitter, two quarter-wave phase retardation plates, and a stationary plane reference mirror, and a first retroreflector, to reflect one polarization component of said input beam twice from a first position on movable plane mirror to produce a first output beam and to reflect the other polarization component of said input beam twice from said stationary plane mirror to produce a second output beam; (3) means, said polarization beamsplitter, for recombining said first and second output beam into a third output beam having two orthogonally polarized components in which the phase difference between the two components of the third output beam is related to four times the linear displacement of said movable plane mirror at said first position; (4) means to divide said third output beam into a fourth output beam and a fifth beam which is parallel to, spatially displaced from, traveling in the same direction as said input beam, and has its polarization components rotated by 90 degrees from said third output beam; (5) means, most preferably a first polarizer, for mixing said orthogonal components of said fourth output beam; (6) means, most preferably a first photo electric detector, to produce a first electrical measurement signal; (7) means, most preferably a first phase meter/accumulator for indicating a first measured phase, the first measured phase being related to four times the linear displacement of said movable plane mirror at said first position; (8) means, most preferably said optical system and a second retroreflector to reflect one polarization component of said fifth beam twice from a second position on said movable plane mirror to produce a sixth output beam and to reflect the other polarization component of said fifth beam twice from said stationary plane mirror to produce a seventh output beam; (9) means, said polarization beamsplitter, for recombining said sixth and seventh output beams into an eighth output beam having two orthogonally polarized components in which the phase difference between two components of the eighth output beam is related to the four times the difference of the linear displacements of said movable plane mirror at said first and second positions; (10) means, most preferably a second polarizer, for mixing said orthogonal components of said eighth output beam; (11) means, most preferably a second photo electric detector, to produce a second electrical measurement signal; (12) means, most preferably a second phase meter/accumulator for indicating a second measured phase, the second measured phase being related to the angular displacement of said movable plane mirror.

THE DRAWINGS

In the drawings,

FIG. 1 depicts in schematic form one embodiment of the instant invention to simultaneously measure linear displacement and angular displacement.

DETAILED DESCRIPTION OF THE INVENTION

Figure 1:
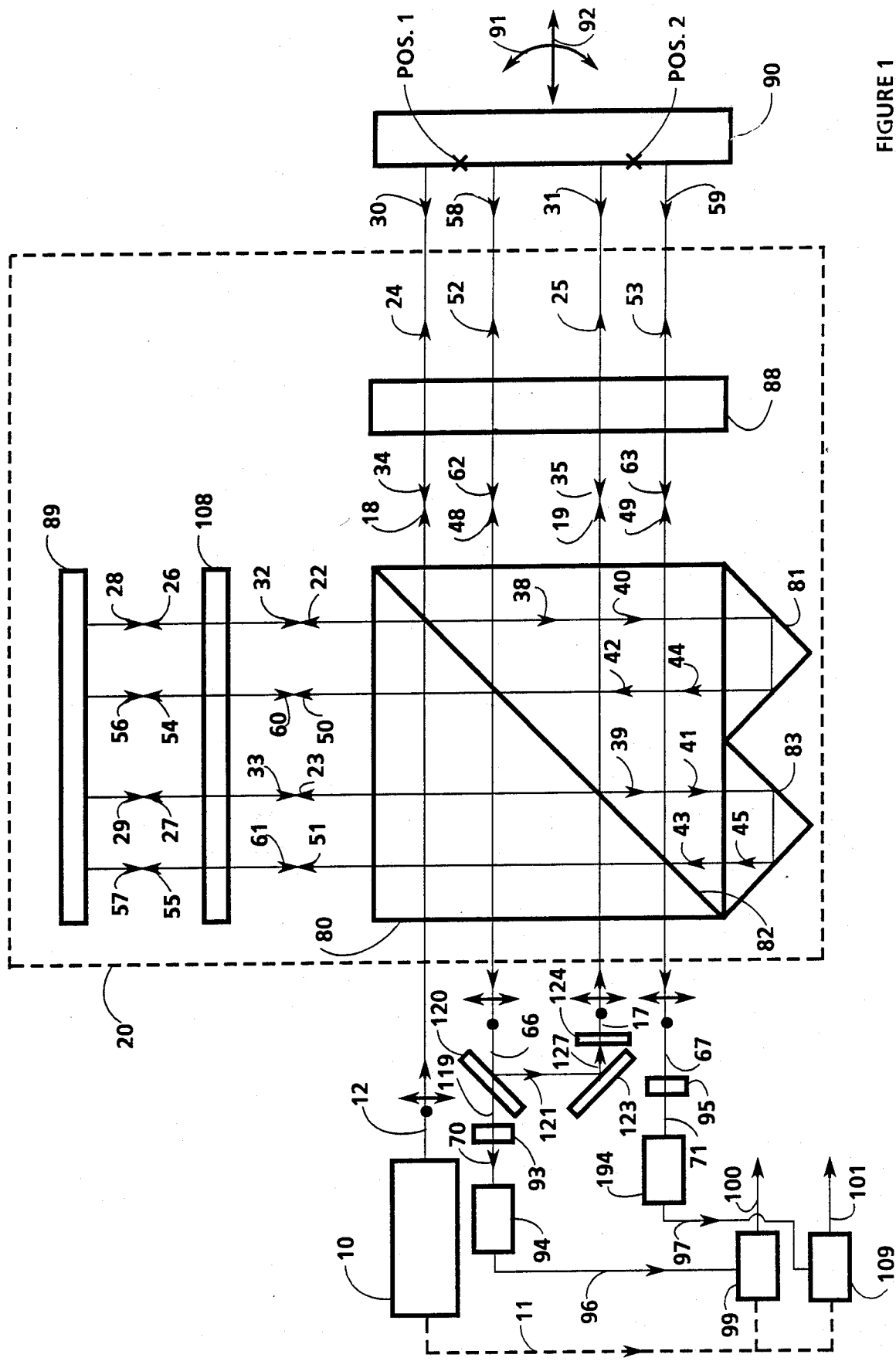

FIG. 1 depicts in schematic form one embodiment of the instant invention. While the apparatus has application for a wide range of radiation sources, the following description is taken by way of example with respect to an optical measuring system. Light source (10), which most preferably uses a frequency stabilized laser, emits input beam (12) which is comprised of two linear orthogonal polarized components as indicated by the dot and arrow, which may or may not be of the same optical frequency. If the frequencies are the same, see for example, Downs, et al., U.S. Pat. No. 4,360,271, issued Nov. 23, 1982. If the frequencies are different, see for example, Bagley, et al., U.S. Pat. No. 3,458,259, issued July 26, 1969 and commonly owned U.S. Pat. No. 4,688,940 issued Aug. 25, 1987, in which source (10) would provide an electrical reference signal (11), shown by the dotted lines, which would correspond to the frequency difference between the two stabilized frequencies. No such reference signal (11) is provided when the two orthogonally polarized components comprising input beam (12) are of the same frequency.

Beam (12) enters polarization beamsplitter (80) and is incident on polarization coating (82). The polarized beam component in the plane of the figure, denoted by the arrow, is transmitted by coating (82) as beam (18) while the polarized beam component perpendicular to the plane of the figure, denoted by the dot, is reflected by polarization coating (82) as beam (22). Beams (18) and (22) pass through quarter-wave phase retardation plates (88) and (108), respectively, and are converted into circularly polarized beams (24) and (26), respectively. Beam (26) is reflected from stationary plane mirror (89) as beam (28) while beam (24) is reflected from movable plane mirror (90), affixed to the stage (not shown) whose relative position and angle is being measured, as beam (30). Beams (30) and (28) pass back through quarter-wave phase retardation plates (88) and (108), respectively, and are converted back into linearly polarized beams (32) and (34), respectively, which are orthogonally polarized to beams (22) and (18), respectively. Beams (34) and (32) are incident on polarization coating (82) of polarization beamsplitter (80). Because their polarization have been rotated 90 degrees, beam (32) is transmitted as beam (38) and beam (34) is reflected as beam (40). Beams (38) and (40) are reflected by retroreflector (81) as beams (42) and (44), respectively. Beams (42) and (44) travel parallel to beams (38) and (40), respectively, by means of the properties of retroreflector (81). Beams (42) and (44) are incident on polarization coating (82) of polarization beamsplitter (80). Beam (42) is transmitted as beam (50) and beam (44) is reflected as beam (48). Beams (48) and (50) pass through quarter-wave phase retardation plates (88) and (108), respectively, and are converted into circularly polarized beams (52) and (54), respectively. Beam (54) is reflected from stationary reference mirror (89) as beam (56) while beam (52) is reflected from movable mirror (90) as beam (58). Beams (58) and (56) pass back through quarter-wave phase retardation plates (88) and (108), respectively, and are converted back into linearly polarized beams (60) and (62), respectively, which now have the same polarization as beams (22) and (18), respectively. Beams (60) and (62) are incident on polarization coating (82) of polarization beamsplitter (80). Beam (62) is transmitted and beam (60) is reflected so that they are recombined by polarization beamsplitter (80) to form beam (66). Beam (66) has two orthogonal polarization components. The relative phase between these two polarization components depends on the optical path length traversed by each polarization component. Translation of movable plane mirror (90), as indicated by arrow (92), causes the relative phase to change. This phase change is directly proportional to twice the linear displacement of movable plane mirror (90) at position 1. Position 1 is the point equidistant from where beams (24) and (52) strike mirror (90). Beam (66) is incident on 50/50 non-polarization beamsplitter (12). One half of beam (66) is reflected as beam (121) and one half is transmitted as beam (119). Beam (119) passes through polarizer (93), oriented at 45 degrees to each polarization component, which mixes the two polarization components in beam (119) to give beam (70). The interference between the two polarization components is detected by photodetector (94) producing electrical signal (96). Phase meter/accumulator (99) extracts the phase change from electrical signal (96). When the two polarization components of beam (12) are of the same optical frequency, reference signal (11) is not required and phase meter/accumulator (99) extracts the phase change from signal (96) as described in aforementioned U.S. Pat. No. 4,360,271. However, when the two polarization components of beam 912) are of different frequencies, additional sinusoidal electrical reference (11) equal in frequency to the difference between the two optical frequencies is required and phase meter/accumulator (99) extracts the phase change from signal (96) as described in aforementioned U.S. Pat. No. 4,688,940. In either event, phase meter/accumulator (99) provides output (100) which is directly proportional to the linear displacement (92) of movable mirror (90) at position 1.

Beam (121) is reflected by mirror (123) to produce beam (127) which is parallel to, but offset from, input beam (12). Beam (127) then passes through half-wave phase retardation plate (124) to produce beam (17). Half-wave phase retardation plate (124) rotates the polarization components in beam (127) by 90 degrees so that the polarization components in beam (17) have been interchanged with respect to the polarization components of beam 912). Beam (17) enters polarization beamsplitter (80) and is incident on polarization coating (82). The polarized beam component in the plane of the figure, denoted by the arrow, is transmitted by coating (82) as beam (19) while the polarized beam component perpendicular to the plane of the figure, denoted by the dot, is reflected by coating (82) as beam (23). Beams (19) and (23) pass through quarter-wave phase retardation plates (88) and (108), respectively, and are converted into circularly polarized beams (25) and (27), respectively. Beam (27) is reflected from stationary mirror (89) as beam (29) while beam (25) is reflected by movable plane mirror (90), affixed to the stage (not shown) whose relative position and angle are being measured, as beam (31). Beams (31) and (29) pass back through quarter-wave phase retardation plates (88) and (108), respectively, and are converted back into linearly polarized beams (35) and (33), respectively, which are orthogonally polarized to beams (19) and (23), respectively. Beams (35) and (33) are incident on polarization coating (82) of polarization beamsplitter (80). Because their polarization have been rotated 90 degrees, beam (33) is transmitted as beam (39) and beam (35) is reflected as beam (41). Beams (39) and (41) are reflected by retroreflector (81) as beams (43) and (45), respectively. Beams (43) and (45) travel parallel to beams (39) and (41), respectively, by means of the properties of retroreflector (83). Beams (43) and (45) are incident on polarization coating (82) of polarization beamsplitter (80). Beam (43) is transmitted as beam (51) and beam (45) is reflected as beam (49). Beams (49) and (51) pass through quarter-wave phase retardation plates (88) and (108), respectively, and are converted into circularly polarized beams (53) and (55), respectively. Beams (53) and (55) are reflected from movable plane mirror (90) and stationary plane mirror (89) as beams (59) and (57), respectively. Beams (59) and (57) pass back through quarter-wave phase retardation plates (88) and (108), respectively, and are converted back into linearly polarized beams (63) and (61), respectively, which now have the same polarization as beams (19) and (23), respectively. Beams (63) and (61) are incident on polarization coating (82) of polarization beamsplitter (80). Beam (63) is transmitted and beam (61) is reflected so that they are recombined by polarization beamsplitter (80) to form beam (67). Beam (67) has two orthogonal polarization components. The relative phase between these two polarization components depends on the path length traversed by each polarization component. This phase change is directly proportional to the angular displacement (91) of movable plane mirror (90) and is measured by passing beam (67) through polarizer (95), oriented at 45 degrees to each polarization component, which mixes the two polarization components in beam (67) to give beam (71). The interference between the two polarization components is detected by photodetector (194) producing electrical signal (97). Phase meter/accumulator (109) extracts the phase change from electrical signal (97). When the two polarization components of beam 912) are of the same optical frequency, reference signal (11) is not required and phase meter/accumulator (109) extracts the phase change from signal (97) as described in aforementioned U.S. Pat. No. 4,360,271. However, when the two polarization components of beam (12) are of different frequencies, additional sinusoidal electrical reference 911) equal in frequency to the difference between the two optical frequencies is required and phase meter/accumulator (109) extracts the phase change from signal (97) as described in aforementioned U.S. Pat. No. 4,688,940. In either event, phase meter/accumulator (109) provides output (101) which is directly proportional to the angular displacement (91) of movable plane mirror (90).

The principal advantages of the instant invention are: (1) a single device provides the simultaneous measurement of both linear and angular displacement, and (2) it is compact.

Although the invention has been described with respect to a light source which emits two stabilized, orthogonally polarized beams of different frequencies, it can also be used when the frequencies are equal without departing from the spirit and scope of the present invention.

While a preferred embodiment of the invention has been disclosed, obviously modification can be made therein, without departing from the scope of the invention as defined in the following claims.

What is claimed is:

1. An interferometer system capable of measuring linear displacement and angular displacement simultaneously of a movable plane mirror comprising a source of a frequency stabilized input beam with two linear orthogonally polarized components; an optical system means comprising a stationary plane reference mirror, said optical system means disposed to reflect one polarization component of said input beam twice from a first position on said movable plane mirror to produce a first output beam and to reflect the other polarization component of said input beam twice from said stationary plane mirror to produce a second output beam; means disposed for recombining said first and second output beam into a third output beam having two orthogonally polarized components in which the phase difference between the two components of the third output beam is related to four times the linear displacement of said movable plane mirror at said first position; means disposed to divide said third output beam into a fourth output beam and a fifth beam which is parallel to, spatially displaced from, traveling in the same direction as said input beam, and has its polarization components rotated from said third output beam; means disposed for mixing said orthogonal components of said fourth output beam; means disposed to produce a first electrical measurement signal; means associated with said first electrical measurement signal for indicating a first measured phase, said first measured phase being related to four times the linear displacement of said movable plane mirror at said first position; means disposed to reflect one polarization component of said fifth beam twice from a second position on said movable plane mirror to produce a sixth output beam and to reflect the other polarization component of said fifth beam twice from said stationary plane mirror to produce a seventh output beam; means disposed for recombing said sixth and seventh output beams into an eighth output beam having two orthogonally polarized components in which the phase difference between said two components of said eighth output beam is related to four times the difference of the linear displacements of said movable plane mirror at said first and second position; means disposed for mixing said orthogonal components of said eighth output beam; means disposed to produce a second electrical measurement signal; and means associated with such second electrical measurement signal for indicating a second measured phase, said second measured phase being related to the angular displacement of said movable plane mirror; whereby said linear and angular displacement of said movable plane mirror may be simultaneously accurately measured in a single interferometer system.

2. An interferometer system in accordance with claim 1 wherein said frequency stabilized input beam sources comprises a laser.

3. An interferometer system in accordance with claim 2 wherein said input beam components are of the same optical frequency.

4. An interferometer system in accordance with claim 2 wherein said input beam components are different optical frequencies.

5. An interferometer system in accordance with claim 1 wherein said input beam components are of the same optical frequency.

6. An interferometer system in accordance with claim 1 wherein said input beam components are different optical frequencies.

7. An interferometer system in accordance with claim 4 wherein said input source further comprises means for providing an electrical reference signal to said means for indicating said first and second measured phases, said reference signal corresponding to the frequency difference between said two different stabilized frequencies.

8. An interferometer system in accordance with claim 6 wherein said input source further comprises means for providing an electrical reference signal to said means for indicating said first and second measured phases, said reference signal corresponding to the frequency difference between said two different stabilized frequencies.

9. An interferometer system in accordance with claim 1 wherein said optical system means further comprises a polarization beamsplitter.

10. An interferometer system in accordance with claim 9 wherein said optical system means further comprises two quarter-wave phase retardation plates.

11. An interferometer system in accordance with claim 10 wherein said optical system means further comprises a first retroreflector.

12. An interferometer system in accordance with claim 2 wherein said optical system means further comprises a polarization beamsplitter.

13. An interferometer system in accordance with claim 9 wherein said means for recombining said first and second output beams into said third output beam comprises said polarization beamsplitter.

14. An interferometer system in accordance with claim 12 wherein said means for recombining said first and second output beams into said third output beam comprises said polarization beamsplitter.

15. An interferometer system in accordance with claim 1 wherein said means for mixing said orthogonal components of said fourth output beam comprises a first polarizer.

16. An interferometer system in accordance with claim 2 wherein said means for mixing said orthogonal components of said fourth output beam comprises a first polarizer.

17. An interferometer system in accordance with claim 1 wherein said means for producing said first electrical measurement signal comprises a first photoelectric detector.

18. An interferometer system in accordance with claim 2 wherein said means for producing said first electrical measurement signal comprises a first photoelectric detector.

19. An interferometer system in accordance with claim 1 wherein said means for indicating said first measured phase comprises a first phase meter/accumulator.

20. An interferometer system in accordance with claim 2 wherein said means for indicating said first measured phase comprises a first phase meter/accumulator.

21. An interferometer system in accordance with claim 1 wherein said means for producing said sixth and seventh output beams comprises said optical system and a retroreflector.

22. An interferometer system in accordance with claim 2 wherein said means for producing said sixth and seventh output beams comprises said optical system and a retroreflector.

23. An interferometer system in accordance with claim 21 wherein said optical system comprises another retroreflector.

24. An interferometer system in accordance with claim 22 wherein said optical system comprises another retroreflector.

25. An interferometer system in accordance with claim 23 wherein said optical system means further comprises a polarization beamsplitter.

26. An interferometer system in accordance with claim 24 wherein said optical system means further comprises a polarization beamsplitter.

27. An interferometer system in accordance with claim 25 wherein said means for recombining said sixth and seventh output beams into an eighth output beam comprises said polarization beamsplitter.

28. An interferometer system in accordance with claim 26 wherein said means for recombining said sixth and seventh output beams into an eight output beam comprises said polarization beamsplitter.

29. An interferometer system in accordance with claim 9 wherein said means for recombining said sixth and seventh output beams into an eighth output beam comprises said polarization beamsplitter.

30. An interferometer system in accordance with claim 29 wherein said frequency stabilized input beam source comprises a laser.

31. An interferometer system in accordance with claim 1 wherein said means for mixing said orthogonal components of said eighth output beam comprises a second polarizer.

32. An interferometer system in accordance with claim 2 wherein said means for mixing said orthogonal components of said eighth output beam comprises a second polarizer.

33. An interferometer system in accordance with claim 15 wherein said means for mixing said orthogonal components of said eighth output beam comprises a second polarizer.

34. An interferometer system in accordance with claim 16 wherein said means for mixing said orthogonal components of said eighth output beam comprises a second polarizer.

35. An interferometer system in accordance with claim 1 wherein said means for producing said second electrical measurements signal comprises a second photodetector.

36. An interferometer system in accordance with claim 2 wherein said means for producing said second electrical measurement signal comprises a second photodetector.

37. An interferometer system in accordance with claim 1 wherein said means for indicating a second measured second phase comprises a second phase meter/accumulator.

38. An interferometer system in accordance with claim 2 wherein said means for indicating a second measured phase comprises a second phase meter/accumulator.

39. An interferometer system in accordance with claim 1 wherein said dividing means for said third output beam comprises means for dividing said third output beam into said fourth output beam and said fifth beam which is parallel to, spatially displaced from, traveling in the same direction as said input beam, and has its polarization components rotated by 90 degrees from said third output beam.

40. An interferometer system in accordance with claim 2 wherein said dividing means for said third output beam comprises means for dividing said third output beam into said fourth output beam and said fifth beam which is parallel to, spatially displaced from, traveling in the same direction as said input beam, and has its polarization components rotated by 90 degrees from said third output beam.

* * * * *